US011080919B2

United States Patent
Yu et al.

(10) Patent No.: US 11,080,919 B2
(45) Date of Patent: Aug. 3, 2021

(54) METHOD, APPARATUS, DEVICE AND COMPUTER READABLE STORAGE MEDIUM FOR RECONSTRUCTING THREE-DIMENSIONAL SCENE

(71) Applicant: Baidu Online Network Technology (Beijing) Co., Ltd., Beijing (CN)

(72) Inventors: Li Yu, Beijing (CN); Shiyu Song, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/353,717

(22) Filed: Mar. 14, 2019

(65) Prior Publication Data
US 2019/0371044 A1 Dec. 5, 2019

(30) Foreign Application Priority Data
Jun. 4, 2018 (CN) .......................... 201810565152.4

(51) Int. Cl.
*G06T 15/04* (2011.01)
(52) U.S. Cl.
CPC .......... *G06T 15/04* (2013.01); *G06T 2200/04* (2013.01)
(58) Field of Classification Search
None
See application file for complete search history.

(56) References Cited

U.S. PATENT DOCUMENTS

| 2018/0157925 A1* | 6/2018 | Zeviar ................. G06K 9/2036 |
| 2019/0102913 A1 | 4/2019 | Madison et al. |
| 2019/0226853 A1* | 7/2019 | Kubiak ................. G01C 21/32 |

FOREIGN PATENT DOCUMENTS

| CN | 102508257 A | 6/2012 |
| CN | 105069842 A | 11/2015 |

(Continued)

OTHER PUBLICATIONS

Yu et al. "Semiautomated extraction of street light poles from mobile LiDAR point-clouds." IEEE Transactions on Geoscience and Remote Sensing 53.3 (2014): 1374-1386. (Year: 2014).*

(Continued)

*Primary Examiner* — Jennifer Mehmood
*Assistant Examiner* — Jed-Justin Imperial
(74) *Attorney, Agent, or Firm* — Lathrop GPM LLP

(57) ABSTRACT

Embodiments of the present disclosure relate to a method, apparatus, device and computer readable storage medium for reconstructing a three-dimensional scene. The method for reconstructing a three-dimensional scene includes acquiring a point cloud data frame set for a three-dimensional scene, point cloud data frames in the point cloud data frame set respectively having a pose parameter. The method further comprises determining a subset corresponding to a part of the three-dimensional scene from the point cloud data frame set. The method further comprises adjusting a pose parameter of a point cloud data frame in the subset to obtain an adjusted subset, the adjusted subset including at least two point cloud data frames having matching overlapping parts. The method further comprises updating the point cloud data frame set using the adjusted subset. In this way, distributed processing on a large amount of point cloud data may be realized.

14 Claims, 5 Drawing Sheets

(56) References Cited

FOREIGN PATENT DOCUMENTS

| CN | 105139445 A | 12/2015 |
|---|---|---|
| CN | 106846392 A | 6/2017 |
| CN | 107452062 A | 12/2017 |
| CN | 109466548 A | 3/2019 |
| FR | 3033973 A1 | 9/2016 |
| JP | 2016519757 A | 7/2016 |
| JP | 2017530343 A | 10/2017 |
| JP | 2019168417 A | 10/2019 |
| JP | 2019211264 A | 12/2019 |
| JP | 2019536035 A | 12/2019 |
| WO | WO2018060313 A1 | 4/2018 |

OTHER PUBLICATIONS

European Patent Application No. 19162888.2, Search Report dated Oct. 11, 2019, 9 pages.
Pyivanainen et al. (2012) "3D City Modeling from Street-Level Data for Augmented Reality Applications," 2012 Second Joint 3DIM/3DPVT Conference: 3D Imaging, Modeling, Processing, Visualization & Transmission, 8 pp.
Shiratori et al. (2015) "Efficient Large-Scale Point Cloud Registration Using Loop Closures," 2015 International Conference on 3D Vision, 9 pp.
Yu et al. (2015) "Semantic alignment of LIDAR data at city scale," 2015 IEEE Conference on Computing, 12 pp.
Chen et al. (2011) "A Study of Three-Dimensional Reconstruction Using High Overlap Aerial Photograph Sequence," 2011 IEEE, 4 pp.
Liu et al. (2016) "A point cloud registration method based on Octree and ICP," School of Geodesy and Geomatics, Wuhan Univ., Key Laboratory of Precise Engineering and Industry Surveying, National Administration of Surveying, Mapping and Geoinformation, Wuhan 430079, China, 5 pp.
Zhao et al. (2008), "SLAM in a Dynamic Large Outdoor Environment using a Laser Scanner", 2008 IEEE International Conference on Robotics and Automation, Pasadena, CA, USA, May 19-23, 2008.
Yu et al. (Mar. 2015), "Semiautomated Extraction of Street Light Poles From Mobile LiDAR Point-Clouds", IEEE Transactions on Geoscience and Remote Sensing, Vol. 53, No. 3.
Chinese Patent Application No. 201810565152.4; Office Action dated Mar. 3, 2021; 8 pgs.
Chen et al., Roads Digital Map Generation with Multi-track GPS Data, IEEE, 2008 International Workshop on Education Technology and Training & 2008 International Workshop on Geoscience and Remote Sensing, 4 pages.
European patent application No. 19 162 888.2, Summons to attend oral proceedings pursuant to Rule 115(1) EPC, May 11, 2021, 12 pages.

\* cited by examiner

METHOD, APPARATUS, DEVICE AND COMPUTER READABLE STORAGE MEDIUM FOR RECONSTRUCTING THREE-DIMENSIONAL SCENE

CROSS-REFERENCE TO RELATED APPLICATIONS

This application claims priority to Chinese Patent Application No. 201810565152.4, filed with the China National Intellectual Property Administration (CNIPA) on Jun. 4, 2018, the content of which is incorporated herein by reference in its entirety.

TECHNICAL FIELD

Embodiments of the present disclosure generally relate to the processing on the point cloud data, and specifically to a method, apparatus, device and computer readable storage medium for reconstructing a three-dimensional scene.

BACKGROUND

A high-precision map is an important part of the autonomous driving technology, and a basis for path planning and decision controlling of an autonomous vehicle, and provides core data for high-precision vehicle self-localization. A high-precision scene reconstruction based on a vehicle-mounted laser radar is a precondition for the production of the high-precision map. In an environment where a global navigation satellite system (GNSS, for example, a global positioning system (GPS)) signal is good, an accurate radar pose may be obtained through a differential GPS/inertial navigation system. A high-precision three-dimensional scene may be reconstructed by projecting acquired point cloud data to a world coordinate system according to the radar pose. However, in scenes such as an urban scene with high-rise buildings and a tunnel scene, the system cannot function properly due to the missing of the GNSS signal. Therefore, it is required to provide a technical solution for reconstructing a three-dimensional scene that at least partially solves the above technical problem.

SUMMARY

According to embodiments of the present disclosure, a solution for reconstructing a three-dimensional scene is provided.

In a first aspect of the present disclosure, a method for reconstructing a three-dimensional scene is provided. The method includes: acquiring a point cloud data frame set for the three-dimensional scene, point cloud data frames in the point cloud data frame set respectively having a pose parameter; determining a subset corresponding to a part of the three-dimensional scene from the point cloud data frame set; adjusting a pose parameter of a point cloud data frame in the subset to obtain an adjusted subset, the adjusted subset including at least two point cloud data frames having matching overlapping parts; and updating the point cloud data frame set using the adjusted subset.

In a second aspect of the present disclosure, an apparatus for reconstructing a three-dimensional scene is provided. The apparatus includes: a point cloud acquiring module, configured to acquire a point cloud data frame set for a three-dimensional scene, point cloud data frames in the point cloud data frame set respectively having a pose parameter; a subset determining module, configured to determine a subset corresponding to a part of the three-dimensional scene from the point cloud data frame set; a pose adjusting module, configured to adjust a pose parameter of a point cloud data frame in the subset to obtain an adjusted subset, the adjusted subset including at least two point cloud data frames having matching overlapping parts; and a point cloud updating module, configured to update the point cloud data frame set using the adjusted subset.

In a third aspect of the present disclosure, an electronic device is provided. The electronic device includes: one or more processors; and a storage device. The storage device is configured to store one or more programs. The one or more programs, when executed by the one or more processors, cause the electronic device to implement the method according to the first aspect of the present disclosure.

In a fourth aspect of the present disclosure, a computer readable medium storing a computer program is provided. The program, when executed by a processor, implements the method according to the first aspect of the present disclosure.

It should be understood that the contents described in the present disclosure are not intended to limit crucial or essential features of the embodiments of the present disclosure, and not used to limit the scope of the present disclosure. Other features of the present disclosure will be easily understood through the following descriptions.

BRIEF DESCRIPTION OF THE DRAWINGS

The above and other features, advantages and aspects of embodiments of the present disclosure will become more apparent in combination with the accompanying drawings and with reference to the following detailed descriptions. In the accompanying drawings, the same or similar reference numerals represent the same or similar elements.

DETAILED DESCRIPTION OF EMBODIMENTS

Embodiments of the present disclosure will be described in more detail below with reference to the accompanying drawings. Certain embodiments of the present disclosure are shown in the accompanying drawings. However, it should be appreciated that the present disclosure may be implemented in various forms, and should not be interpreted as being limited by the embodiments described herein. Conversely, the embodiments are provided for a more thorough and complete understanding for the present disclosure. It should be understood that the accompanying drawings and embodiments in the present disclosure are only illustrative, and not used to limit the scope of protection of the present disclosure.

As mentioned above, in the field of autonomous driving, the existing map construction method constructs a map mainly depending on a high-precision global positioning result provided by an integrated navigation system of the global navigation satellite system (GNSS)/inertial navigation system (SINS), and the system can provide a centimeter-level precision at a location such as an open highway. However, in a typical urban scene such as a scene with dense high-rise buildings and a tunnel scene, the GPS signal is weak or even completely missing, and inertial navigation errors are quickly accumulated, so that an accurate laser radar pose cannot be obtained, and the reconstruction precision of the scene cannot meet the autonomous driving demand. In addition, the lack of the GPS signal also leads to a high computational amount during the stitching of point cloud data frames, which makes it difficult to achieve a high computational efficiency and accuracy, especially for large-scale urban roads.

For the above problems, the embodiments of the present disclosure provide a solution for reconstructing a three-dimensional scene. The solution divides the three-dimensional scene into a plurality of separate parts and optimizes a pose parameter of a point cloud data frame of each part. Then, the optimized parts are merged together. In this way, distributed processing on the reconstruction of the three-dimensional scene and the construction of the high-precision map may be realized, thereby improving the processing efficiency and the computational accuracy for a complicated scene.

The embodiments of the present disclosure will be specifically described below in combination with FIGS. 1-7.

Figure 1:
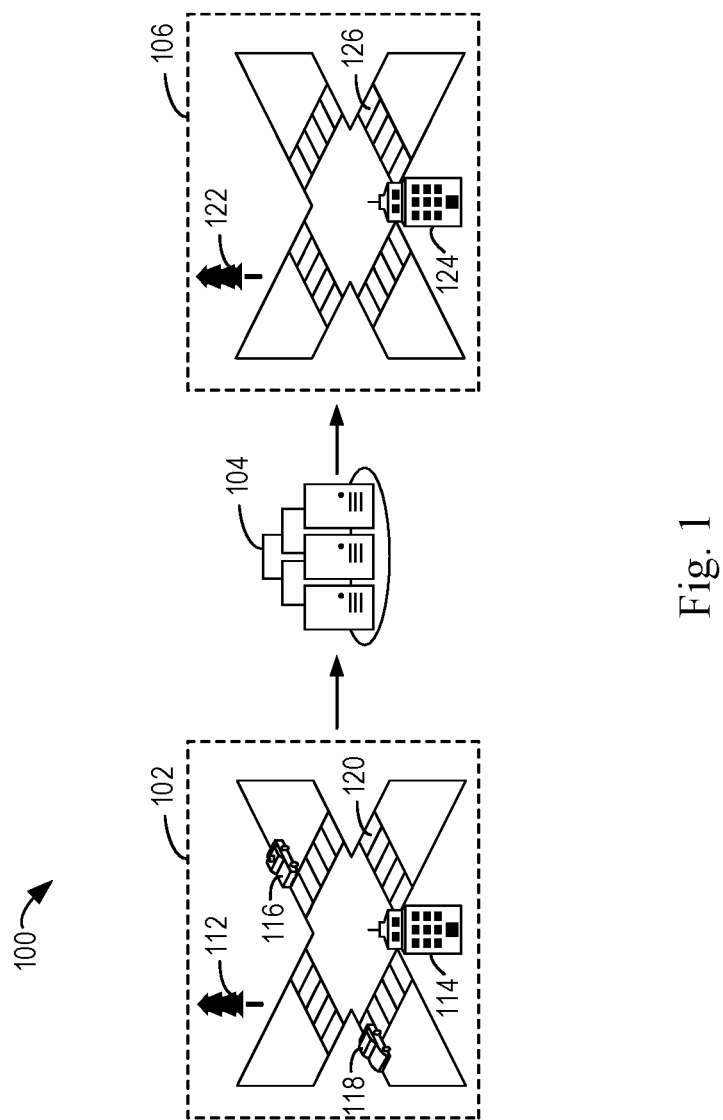
FIG. 1 is a schematic diagram of an exemplary environment in which embodiments of the present disclosure can be implemented.

FIG. 1 is a schematic diagram of an exemplary environment 100 in which embodiments of the present disclosure can be implemented. In the environment 100, a collection entity 116 (e.g., a vehicle) provided with a laser radar moves along a road 120, to collect data related to the scene 102 where the collection entity 116 is located.

In the context of the present disclosure, the term "collection entity" is an entity capable of collecting a point cloud, data and/or other appropriate data, for example, a vehicle, a person, or other devices capable of moving. The laser radar may be a single-line laser radar, a multi-line laser radar, a 3D laser radar, or the like. It should be understood that the above example is merely for the purpose of illustration, and is not intended to limit the scope of the embodiments of the present disclosure.

During the moving of the collection entity 116, the laser radar collects a point cloud describing three-dimensional information of the scene 102 where the collection entity 116 is located. As shown in FIG. 1, the scene 102 includes a road 120 on which the collection entity 116 is currently located, trees 112 on both sides of the collection entity 116, a building 114 in front of the collection entity 116, etc. The collected point cloud data may describe three-dimensional information (for example, spatial coordinates) of points on the road 120, the trees 112 and the building 114. Additionally, the scene 102 further includes some moving objects, for example, a vehicle 118-. Thus, the collected point cloud data may further include three-dimensional information (for example, spatial coordinates) describing a moving object such as the vehicle 118.

Taking a multi-line laser radar as an example, the point cloud obtained by one scan may be referred to as a frame of point cloud or a point cloud data frame. For example, if a 64-line laser radar scans one circle in 0.1 second, the laser radar may obtain 10 frames of point cloud in one second. It should be appreciated by those skilled in the art that the position (e.g., three-dimensional coordinates) and the orientation (e.g., attitude angle) of a sensor such as the laser radar may also be referred to as the pose of the sensor. For example, the sensor may be considered to have the pose defined by a pose parameter of when 3D data being collected. For example, the pose parameter may include six parameters such as coordinates and a pitch angle.

The collection entity 116 may upload the point cloud collected during the moving to a cloud storage device. It should be appreciated by those skilled in the art that the point cloud may also be stored on other storage devices, and is not limited to being stored to the cloud storage device. For example, the point cloud may also be stored in a conventional storage device such as a hard disk, which may be disposed, for example, in the collection entity 116.

A computing device 104 may acquire the data collected by the collection entity 116 from the cloud storage device or the other storage devices. The computing device 104 may be a distributed computing device having a parallel computing capability to improve the computational performance of processing large scale data. The computing device 104 may process the point cloud data, to reconstruct and output the three-dimensional scene, for example, a scene 106 shown in FIG. 1. In the reconstructed scene 106, a road 126, a tree 122, and a building 124 are shown. The road 126 may also include information of a lane line. The reconstructed scene 106 may be further used to form a high-precision map for being used in an application such as autonomous driving.

It should be understood that the numbers, structures, connection relationships, and layouts of the components shown in FIG. 1 are illustrative and not restrictive, and some of the components are alternative. Those skilled in the art may make an adjustment in the number, structure, connection relationship, layout, etc. within the scope of the present disclosure.

Figure 2:
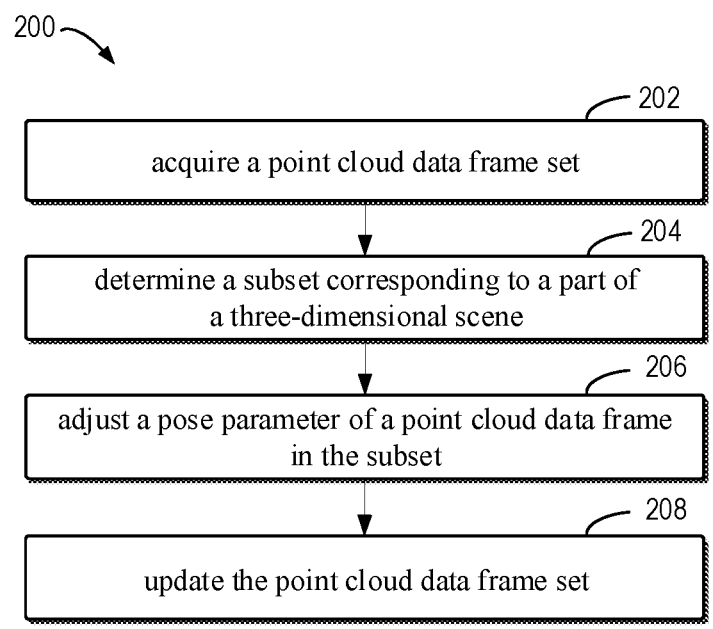
FIG. 2 is a flowchart of a method for reconstructing a three-dimensional scene according to the embodiments of the present disclosure.

FIG. 2 is a flowchart of a method 200 for reconstructing a three-dimensional scene according to some embodiments of the present disclosure. The method 200 may be performed by the computing device 104 shown in FIG. 1. As previously described, the computing device 104 may be a distributed computing device including a plurality of computing nodes.

At block 202, the computing device 104 acquires a point cloud data frame set for a three-dimensional scene, and point cloud data frames in the point cloud data frame set respectively have a pose parameter. For example, the point cloud data frame set may be acquired by the collection entity on an urban road by means of a laser radar. As described above, when a point cloud data frame is being acquired, the position and orientation of a sensor such as the laser radar may be referred to as the pose parameter corresponding to the point cloud data frame. For example, the pose parameter may include six parameters such as coordinates and a pitch angle. The collection entity may further include a global navigation satellite system (GNSS) and/or an inertial measurement unit (IMU). GNSS includes a global positioning system (GPS), a Beidou system, a Galileo system, a GLONASS, etc.

At block 204, the computing device 104 determines a subset corresponding to a part of the three-dimensional scene from the point cloud data frame set. In this way, the three-dimensional scene may be divided into a plurality of parts, and each part corresponds to a corresponding point cloud data frame subset. In the situation where the computing device 104 is a distributed computing device, different point cloud data frame subsets may be sent to different computing nodes, so that the different computing nodes process the point cloud data frame subsets in parallel, to improve the computational efficiency. Therefore, the problem that the cartographic optimization computation for the large-scale urban scene is time-consuming is effectively solved.

Figure 3:
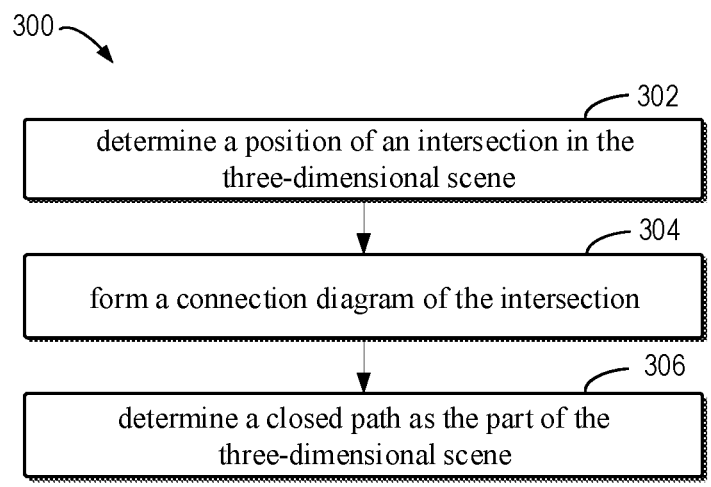
FIG. 3 is a flowchart of a method for determining a point cloud data frame subset corresponding to a part of a three-dimensional scene according to the embodiments of the present disclosure.

According to the embodiments of the present disclosure, a subset corresponding to a specific part of the scene may be determined, in various ways, from the point cloud data frame set. FIG. 3 is a flowchart of a method 300 for determining a point cloud data frame subset according to some embodiments of the present disclosure. The method 300 may be performed by the computing device 104 shown in FIG. 1.

At block 302, the computing device 104 determines the position of the intersection in the three-dimensional scene based on a trajectory corresponding to the point cloud data frame set. The trajectory corresponding to the point cloud data frame set may be determined based on an initial pose of a point cloud data frame. For example, the initial pose of the point cloud data frame may be determined by the global navigation satellite system (GNSS) and/or the inertial measurement unit (IMU). In some embodiments, there is a good GNSS signal at the initial position of the collection entity, and the position of the collection entity may be accurately determined. As the collection entity moves, the GNSS signal may be blocked and become weak or disappear, and the initial pose may be determined in the form of increments by the IMU.

In some embodiments, a plurality of collections for point cloud data may be performed on some roads, and thus, there may be a plurality of trajectories for these roads. Therefore, dilation may be performed on a trajectory image to merge a road corresponding to the plurality of trajectories into one line. For example, there may be 10 trajectories on one road, and the 10 trajectories may be merged into one line through the dilation. For the image after the dilation, a corner point of the intersection may be determined through a corner point detection method. It should be appreciated by those skilled in the art that the corner point of the intersection may be determined using a corner point detection method currently known or developed in future. In this regard, the present disclosure is not limited herein. Through the corner point detection method, one or more corner points corresponding to one intersection may be detected. For example, 2 or 4 points may be detected at one intersection. In the situation where a plurality of corner points are detected at one intersection, the position of the intersection may be determined by clustering. The plane coordinates in the global coordinate system of this position may be back-calculated through the pixels of the image.

At block 304, a connection diagram connecting the intersection is formed based on the position of the intersection. For example, depending on the connectivity of the trajectories, the determined intersection may be connected to form the connection diagram of the intersection.

At block 306, a closed path is determined as the part of the three-dimensional scene based on the connection diagram. For example, through an extracted intersection and a sequence of the trajectories collected by the laser radar, the interconnectivity of the coordinates of the intersection is obtained, and various closed paths (also referred to as closed loops or loopbacks) are determined. In this situation, a closed-loop detection (also referred to as loopback detection) may be performed during the stitching of point clouds, to reduce the drift of an error and improve the optimization accuracy. It should be appreciated by those skilled in the art that the closed-loop detection may be performed using any appropriate closed-loop detection method currently known or developed in future.

Returning to FIG. 2, at block 206, a pose parameter of a point cloud data frame in the subset is adjusted to obtain an adjusted subset. The adjusted subset includes at least two point cloud data frames having matching overlapping parts. For example, the point cloud data frames in the point cloud data frame subset may be stitched to reduce the ghosting of overlapping parts of the point cloud data frames.

Figure 4:
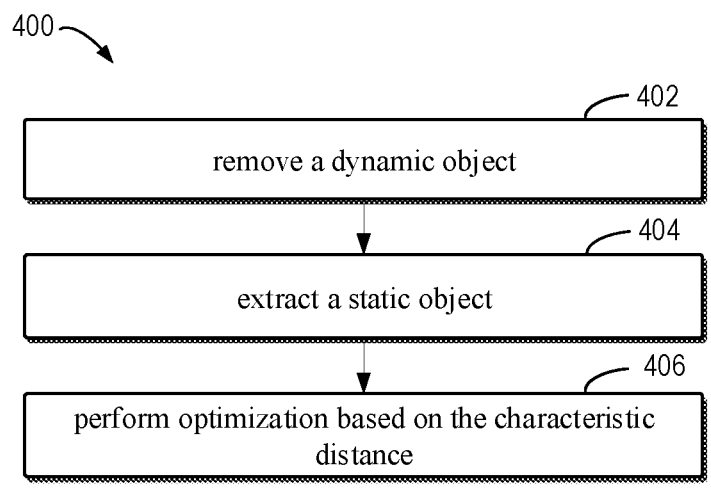
FIG. 4 is a flowchart of a method for adjusting a pose parameter according to the embodiments of the present disclosure.

The pose parameter may be adjusted in various ways. FIG. 4 is a flowchart of a method 400 for adjusting a pose parameter according to some embodiments of the present disclosure. The method 400 may be performed by the computing device 104. For example, in the situation where the computing device 104 is a distributed computing device, the method 400 may be performed by one computing node in the distributed computing device. Moreover, it should be appreciated by those skilled in the art that although FIG. 4 illustrates the method 400 including a plurality of sequential steps, one or more of these steps may be omitted and the sequence of these steps may be appropriately adjusted without departing from the scope of the present disclosure.

At block 402, the computing device 104 removes a data point associated with a dynamic object from the point cloud data frame in the point cloud data frame subset. As shown in FIG. 1, the three-dimensional scene 102 may include a dynamic object, for example, the vehicle 118 and a pedestrian (not shown). For the reconstruction of the three-dimensional scene 102, a dynamic object may be considered as noise. Therefore, in order to eliminate the influence of the dynamic object, the data point representing a dynamic object may be first removed from the point cloud data frame.

In some embodiments, a dynamic object may be detected using a method based on a ground detection and a bounding box. In the method, the ground may be extracted from the point cloud data frame. For example, the ground may be extracted using a method such as a random sample consensus (RANSAC) method and a plane fitting method. It should be appreciated by those skilled in the art that the ground may be extracted using a method currently known or developed in future. In this regard, the present disclosure is not limited herein. After the ground is extracted, the data points representing the ground may be removed from the point cloud data frame.

In an actual application scenario, non-ground data points may include a wall of a building, a plant (e.g., a tree), etc. After the data points representing the ground are removed, the spatial distribution of these objects may present discreteness and discontinuity due to without the connection to the ground. In this situation, the data points representing the objects may be divided into a plurality of groups by clustering, and each group may represent a corresponding object. For example, each vehicle, tree, etc. may be clustered into group, respectively.

Dynamic object may be matched and extracted based on an attribute (e.g., geometric property) of the object such as the vehicle. For example, the dynamic object may be matched and extracted by means of a bounding box. For example, taking the vehicle as an example, the vehicle may be detected using a bounding box matching the size (e.g., length, width and height) of the vehicle. After the dynamic object is extracted, the data points representing the dynamic object may be removed from the point cloud data frame and the data points representing the ground may be added.

Since the positions of a dynamic object in different point cloud data frames are different, an error is generated during the stitching of the point clouds. The generation of the error may be reduced or eliminated by removing the data points representing the dynamic object from the point cloud data frame, thereby the matching accuracy and stability are improved. The processing on the dynamic object is described above in combination with the method based on the ground detection and the bounding box. However, it should be appreciated by those skilled in the art that the dynamic object may also be removed using other detection methods known or developed in future such as a rule based detection or a learning based detection.

At block 404, the computing device 104 may extract a static object from the point cloud data frame. For example, the computing device 104 may extract a plane (the ground, the wall, etc.) and a pillar (a trunk, a street light, etc.) in the point cloud data frame, retaining only the data having highly-structured information, to improve a subsequent matching accuracy. The computing device 104 may extract a planar characteristic and/or a straight line characteristic. For example, the plane such as the ground may be extracted using the point cloud library (PCL), and the pillar such as the trunk may be extracted using the region growing method. It should be appreciated by those skilled in the art that the static object may also be extracted using any appropriate method currently known or developed in future.

At block 406, the computing device 104 may adjust the pose parameter based on a characteristic distance between corresponding objects in point cloud data frames having an overlap. For example, if two point cloud data frames scans a common area, the two point cloud data frames may form the point cloud data frames having an overlap. For example, there is an overlap between a first point cloud data frame and a second point cloud data frame, a characteristic distance between corresponding objects in the first point cloud data frame and the second point cloud data frame may be determined, and the pose parameter is adjusted based on the characteristic distance. The object may be the planar characteristic (e.g., the ground or the wall) or the straight line characteristic (e.g., the trunk or the street light) determined at block 404. The characteristic distances between all of these objects in the point cloud data frame subset may be summed, and the pose parameter is adjusted by minimizing the sum of the characteristic distances. For example, the least squares method may be used. It is appreciated by those skilled in the art that any appropriate method currently known or developed in the future may be adopted.

As mentioned above, when the point cloud data is collected, a plurality of collections may be performed back and forth on the road. For example, 5 collections may be performed back and forth on each road. Thus, for one point cloud data frame, point cloud data frames having an overlap with this point cloud data frame may include one or more point cloud data frames continuously collected in time, and point cloud data frames collected when this position (e.g., within a certain distance of the position) is passed through many times. Therefore, one point cloud data frame may be paired with a plurality of point cloud data frames.

Optimizing the pose parameters of all of the point cloud data frames in the point cloud data frame subset together occupies a large amount of computation, and thus the situation where the processing is performed by a separate computing node is more advantageous. In addition, by extracting the planar characteristic and the rectilinear characteristic, and performing matching based on the planar characteristic and the rectilinear characteristic, noise may be reduced, and the matching accuracy and the computational efficiency may be improved.

In some embodiments, —the extracted plane and cylinder (the cylinder may be considered as a straight line passing through a center) may be expressed as $f_k(c_k,n_k)$. Here, $c_k$ represents the coordinates of the center, and $n_k$ represents the normal vector of the plane or the direction of the straight line. When the point clouds are matched, the characteristic distance from point p to the planar characteristic may be calculated according to formula (1), and the characteristic distance from point p to the straight line characteristic may be calculated according to formula (2).

$$d=(p-c_k)\cdot n_k \quad (1)$$

$$d=\|(p-c_k)\times n_k\| \quad (2)$$

The priori pose of the laser radar is $\bar{p}_k$, and two frames of laser point clouds are respectively $M_1$ and $M_2$ (including the extracted planar characteristic and the normal vector mentioned above). The purpose of matching the point clouds is to determine an optimal pose difference $\Delta p$ by matching $M_1$ and $M_2$. In this way, the posterior of the laser radar may be derived as $\hat{p}_k = \Delta p \cdot \bar{p}_k$.

As described above, corresponding characteristics (e.g., the planar characteristic and/or the rectilinear characteristic) of point cloud data frames having overlapping areas may be determined, and a line-line distance and a plane-plane distance are calculated for these characteristics. The line-line distances and a plane-plane distances of all the point cloud data frames having overlapping areas are summed as an optimization target function, and the optimal pose difference $\Delta p$ is solved by minimizing the target function, as illustrated in formula (3):

$$\Delta p \leftarrow \underset{\Delta p}{\mathrm{argmin}}\left\{\sum_j\sum_i\left(\sum_k\left\|(\Delta p\cdot x_k^{M_i}-x_k^{M_j})\cdot n_i^{M_j}\right\|^2 + \sum_i\left\|(\Delta p\cdot x_k^{M_i}-x_k^{M_j})\times n_i^{M_j}\right\|^2\right)\right\}. \quad (3)$$

Here, i and j represent two point cloud data frames and k represents a data point.

The pose parameter optimization method according to some embodiments of the present disclosure is described above in combination with formulas (1)-(3). It should be appreciated by those skilled in the art that the purpose of providing the above formulas is to more clearly describe the embodiments of the present disclosure, and not to limit the embodiments of the present disclosure.

Returning to FIG. 2, at block 208, the computing device 104 updates the point cloud data frame set using the adjusted subset. Since each part is optimized separately, the global pose adjustment is performed through the constraint of the co-participating pose. For example, the pose parameters of all of the point cloud data frames in the point cloud data frame subset may be optimized overall. Specifically, another part of the three-dimensional scene may be determined, and the another part overlaps this part of the three-dimensional scene. For example, two closed paths may have a partially overlapping path. For the another part of the three-dimensional scene, a point cloud data frame subset corresponding to the another part may be determined, which may have been processed by the method 300 shown at block 206 or in FIG. 3. By adjusting the pose parameters of the point cloud data frames in the two subsets, the corresponding point cloud data frames in the overlapping part of the three-dimensional scene overlaps each other, or the pose parameters of the corresponding point cloud data frames are equal.

For example, for each point cloud data frame subset, there is a corresponding pose adjustment parameter, for example, rotation matrix A and translation vector b. For example, if there is an overlap between the $i^{th}$ scene part and the $j^{th}$ scene part, for the overlapping part, the pose parameters of the corresponding point cloud data frames should be equivalent due to the repeated use of the point cloud data frame. For example, the corresponding point cloud data frames should satisfy the relationship $A_iS_i+b_i=A_jS_j+b_j$. Here, $A_i$, $b_i$, $A_j$ and $b_j$ respectively represent the rotation matrix and translation vector of the $i^{th}$ point cloud data frame subset and the rotation matrix and translation vector of the $j^{th}$ point cloud data frame subset, and $S_i$ and $S_j$ represent the pose of the $i^{th}$ point cloud data frame subset and the pose of the $j^{th}$ point cloud data frame subset. The pose of a point cloud data frame subset may be defined as the pose of one of the point cloud data frames, and the poses of other point cloud data frames in the subset may be understood as relative poses of the pose of the point cloud data frame. For example, the pose of the point cloud data frame repeatedly used in the two scene parts may be defined as the pose of the corresponding subset.

In some embodiments, if the GNSS (e.g., GPS) may provide a confidence level, the pose of a good quality GNSS signal may be fixed to optimize the overall laser radar pose. For example, the pose parameter of the corresponding point cloud data frame may be determined by GNSS, and the point cloud data frame set is updated based on the pose parameter of the point cloud data frame. For example, $A_i*S^H_i+b_i=\hat{S}^H$, the pose ($S^H$) of the highly credible GNSS remains unchanged before and after the optimization. For example, if one point cloud data frame in a point cloud data frame subset corresponds to a good GNSS signal, the pose parameter of the point cloud data frame may deviate from the original pose parameter after being optimized at block 206, while the original pose parameter is determined through a GNSS signal having a high confidence level. Therefore, the pose parameter of this point cloud data frame may be amended as the original pose parameter, and the pose parameters of other point cloud data frames in the subset in which the point cloud data frame is included are adjusted in the same way. With the help of the GNSS signal having a high confidence level, the accuracy in stitching the point clouds may be further improved.

Figure 5:
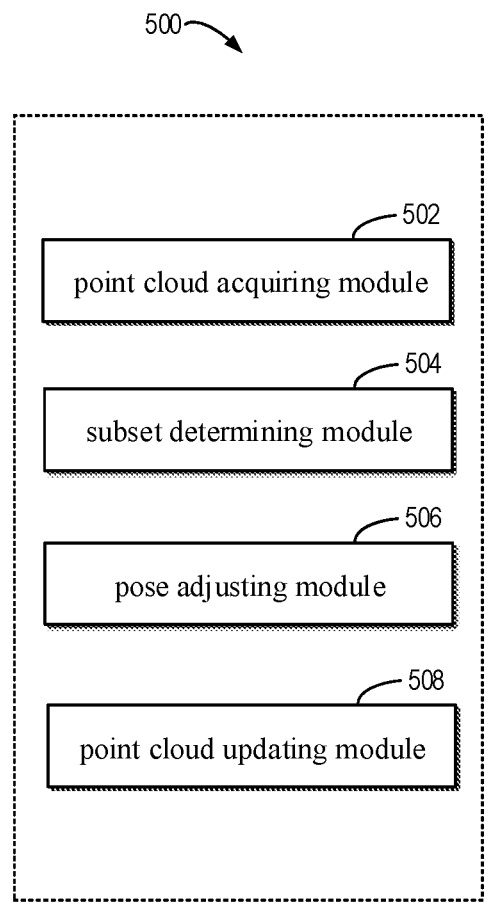
FIG. 5 is a block diagram of an apparatus for reconstructing a three-dimensional scene according to the embodiments of the present disclosure.

FIG. 5 is a block diagram of an apparatus 500 for reconstructing a three-dimensional scene according to some embodiments of the present disclosure. The apparatus 500 may be included in the computing device 104 in FIG. 1 or implemented as the computing device 104. As shown in FIG. 5, the apparatus 500 includes a point cloud acquiring module 502, configured to acquire a point cloud data frame set aiming at a three-dimensional scene, point cloud data frames in the point cloud data frame set respectively having a pose parameter. The apparatus 500 further includes a subset determining module 504, configured to determine a subset corresponding to a part of the three-dimensional scene from the point cloud data frame set. The apparatus 500 further includes a pose adjusting module 506, configured to adjust a pose parameter of a point cloud data frame in the subset to obtain an adjusted subset, the adjusted subset including at least two point cloud data frames having matching overlapping parts. The apparatus 500 further includes a point cloud updating module 508, configured to update the point cloud data frame set using the adjusted subset.

In some embodiments, the subset determining module 504 includes: an intersection determining module, configured to determine a position of an intersection in the three-dimensional scene based on a trajectory corresponding to the point cloud data frame set; a connection diagram forming module, configured to form a connection diagram of connecting the intersection based on the position of the intersection; and a part determining module, configured to determine a closed path as the part of the three-dimensional scene based on the connection diagram.

In some embodiments, the intersection determining module includes: a line determining module, configured to determine a line representing a road by dilating the trajectory; a corner point determining module, configured to determine at least one point at the intersection based on the line; and a position determining module, configured to determine the position of the intersection based on the at least one point at the intersection.

In some embodiments, the pose adjusting module 506 includes: a dynamic object removing module, configured to remove data points associated with a dynamic object from point cloud data frames in the subset, to update the subset; and a first pose parameter adjusting module, configured to adjust a pose parameter of a point cloud data frame in the updated subset.

In some embodiments, the dynamic object removing module includes: a ground removing module, configured to remove data points representing a ground from the point cloud data frames; a dynamic object recognizing module, configured to recognize the dynamic object in the point cloud data frames; a data point removing module, configured to remove data points representing the dynamic object from the point cloud data frames; and a ground adding module, configured to add data points representing the ground into the point cloud data frames.

In some embodiments, the dynamic object recognizing module includes: a clustering module, configured to cluster point cloud data in the point cloud data frames to determine a plurality of clusters in the point cloud data frames; and a matching module, configured to determine a cluster matching an attribute of the dynamic object from the plurality of clusters.

In some embodiments, the pose adjusting module 506 includes: data points extracting module, configured to extract data points representing a static object from a plurality of point cloud data frames, to update the subset; and adjusting a pose parameter of a point cloud data frame in the updated subset.

In some embodiments, the at least two point cloud data frames include a first point cloud data frame and a second point cloud data frame. The pose adjusting module 506 includes: a characteristic distance determining module, configured to determine a characteristic distance between corresponding objects in the first point cloud data frame and the second point cloud data frame; and a second pose parameter adjusting module, configured to adjust the pose parameter based on the characteristic distance.

In some embodiments, the point cloud updating module 508 includes: the part determining module, configured to determine another part of the three-dimensional scene, the another part overlapping the part of the three-dimensional scene; the subset determining module, configured to determine another subset corresponding to the another part of the three-dimensional scene from the point cloud data frame set; and a third pose parameter adjusting module, configured to adjust a pose parameter of a point cloud data frame in the subset and a pose parameter of a point cloud data frame in the another subset, to cause a third point cloud data frame in the subset to overlap a fourth point cloud data frame in the another subset.

In some embodiments, the point cloud updating module 508 includes: a pose parameter determining module, configured to determine a pose parameter of a fifth point cloud data frame in the part through a global navigation satellite system; and a point cloud data updating module, configured to update the point cloud data frame set based on the pose parameter of the fifth point cloud data frame.

Figure 6:
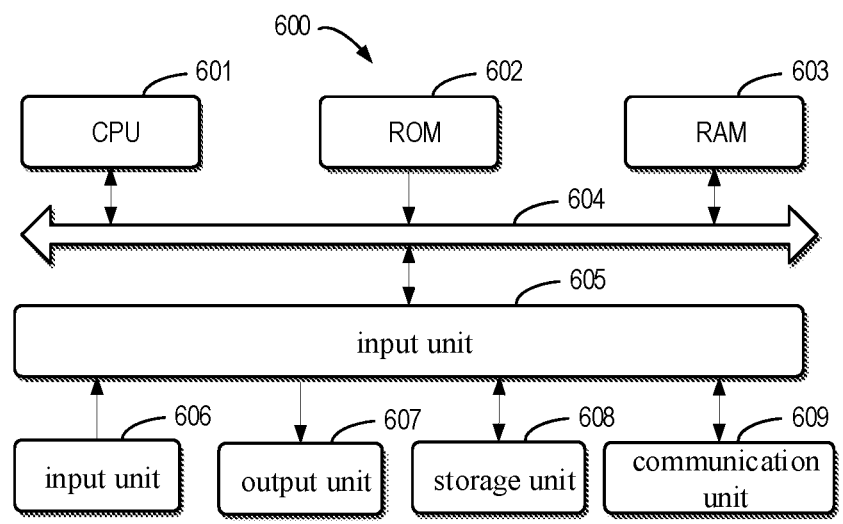
FIG. 6 is a block diagram of an electronic device capable of implementing the embodiments of the present disclosure.

FIG. 6 is schematic a block diagram of a device 600 which may be used to implement the embodiments of the present disclosure. The device 600 may be used to implement the computing device 104 in FIG. 1. As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

A plurality of components in the device 600 are coupled to the I/O interface 605, including: an input unit 606, for example, a keyboard and a mouse; an output unit 607, for example, various types of displays and speakers; the storage unit 608, for example, a disk and an optical disk; and a communication unit 609, for example, a network card, a modem, or a wireless communication transceiver. The communication unit 609 allows the device 600 to exchange information/data with other devices over a computer network such as the Internet and/or various telecommunication networks.

The processing and processes described above, for example, the methods 200-400, may be performed by the processing unit 601. For example, in some embodiments, the methods 200-400 may be implemented as computer software programs tangibly embodied in a machine readable medium, for example, the storage unit 608. In some embodiments, some or all of the computer programs may be loaded and/or installed onto the device 600 via the ROM 602 and/or the communication unit 609. When a computer program is loaded into the RAM 603 and executed by the CPU 601, one or more of steps of the methods 200-400 described above may be performed. Alternatively, in other embodiments, the CPU 601 may be configured to perform the methods 200-400 by any other suitable means (e.g., by means of firmware).

The present disclosure may be a method, an apparatus, a system, and/or a computer program product. The computer program product may include a computer readable storage medium having computer readable program instructions for executing various aspects of the present disclosure.

A computer readable storage medium may be a tangible device that may contain or store instructions for use by an instruction execution device. The computer readable storage medium, for example, may be, but not limited to, an electronic storage device, a magnetic storage device, an optical storage device, an electromagnetic storage device, a semiconductor storage device, or any suitable combination of the foregoing. More specific examples (non-exhaustive list) of the computer readable storage medium include: a portable computer disk, a hard disk, a random access memory (RAM), a read only memory (ROM), an erasable programmable read only memory (EPROM or flash memory), a static random access memory (SRAM), a portable compact disk read only memory (CD-ROM), a digital versatile disc (DVD), a memory stick, a floppy disk, 丁 and any suitable combination of the foregoing. The computer readable storage medium used herein is not interpreted as a transient signal itself, for example, a radio wave or other freely propagating electromagnetic waves, an electromagnetic wave propagating through a waveguide or other transmission media (e.g., a light pulse through a fiber optic cable), or an electrical signal transmitting through an electric wire.

The computer readable program instruction described herein may be downloaded from the computer readable storage medium to various computing/processing devices, or downloaded to an external computer or external storage device through a network, for example, the Internet, a local area network, a wide area network and/or a wireless network. The network may include a copper transmission cable, a fiber optic transmission, a wireless transmission, a router, a firewall, a switch, a gateway computer, and/or an edge server. A network adapter card or network interface in each computing/processing device receives a computer readable program instruction from the network and forwards the computer readable program instruction to be stored into a computer readable storage medium in each computing/processing device.

A computer program instruction for implementing the operations of the present disclosure may be an assembly instruction, an instruction set architecture (ISA) instruction, a machine instruction, a machine related instruction, a microcode, a firmware instruction, state setting data, or a source code or a target code written in any combination of one or more programming languages, including an object-oriented programming language (e.g., Smalltalk and C++) and a general procedural programming language (e.g., "C" language or a similar programming language). The computer readable program instruction may be executed entirely on a user computer, executed partially on the user computer, executed as a standalone software package, executed partially on the user computer and partially on a remote computer, or executed entirely on the remote computer or a server. When the remote computer is involved, the remote computer may be connected to the user computer through any type of network, including the local area network (LAN) or the wide area network (WAN), or be connected to an external computer (e.g., connected through Internet provided by an Internet service provider). In some embodiments, by using the state information of the computer readable program instruction, an electronic circuit is customized, for example, a programmable logic circuit, a field programmable gate array (FPGA) or a programmable logic array (PLA). The electronic circuit may execute the computer readable program instruction, thereby implementing the aspects of the present disclosure.

Various aspects of the present disclosure are described herein with reference to the flowcharts and/or the block diagrams of the methods, the apparatus (system) and the computer program product according to the embodiments of the present disclosure. It should be understood that each block in the flowcharts and/or the block diagrams as well as a combination of the blocks in the flowcharts and/or the block diagrams may be implemented by computer readable program instructions.

These computer readable program instructions may be provided to a processing unit of a general purpose computer, a special purpose computer or other programmable data processing apparatuses, to produce a machine. Thus, an apparatus implementing a function/action defined in one or blocks in the flowcharts and/or the block diagrams is produced when theses instructions are executed by the processing unit of a computer or other programmable data processing apparatuses. These computer readable program instructions may also be stored into the computer readable storage medium, to cause the computer, the programmable data processing apparatuses and/or other devices to operate in a particular way. Therefore, the computer readable medium storing instructions includes a manufactured product, including instruction of various aspects implementing the function/action defined in one or blocks in the flowcharts and/or the block diagrams.

The computer readable program instructions may also be loaded onto the computer, the other programmable data processing apparatuses or the other devices, to perform a series of operation steps on the computer, the other programmable data processing apparatuses or the other devices, to produce a computer implementation process. Thus, the instructions executed on the computer, the other programmable data processing apparatuses or the other devices implement the function/action defined in one or blocks in the flowcharts and/or the block diagrams.

The flowcharts and the block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or an instruction portion, the module, the program segment, or the instruction portion comprising one or more executable instructions for implementing specified logic functions. In some alternative implementations, the functions denoted by the blocks may occur in a sequence different from the sequences shown in the drawings. For example, any two blocks presented in succession may be executed, substantially in parallel, or they may sometimes be executed in a reverse sequence, depending on the function involved. It should also be noted that each block in the block diagrams and/or flowcharts as well as a combination of blocks may be implemented using a dedicated hardware-based system executing specified functions or actions, or by a combination of dedicated hardware and computer instructions.

The embodiments of the present disclosure are described above, and the foregoing description is illustrative and not exhaustive, and is not limited to the disclosed embodiments. Numerous modifications and alterations are apparent to those skilled in the art without departing from the scope and spirit of the embodiments of the present disclosure. The selection for the terms used herein is intended to best explain the principles of the embodiments, the actual applications or the improvements for the techniques in the market, or to enable other ordinary skilled in the art to understand the embodiments disclosed herein.

What is claimed is:

1. A method for reconstructing a three-dimensional scene, comprising:
   acquiring a point cloud data frame set for the three-dimensional scene, point cloud data frames in the point cloud data frame set respectively having a pose parameter;
   determining a subset corresponding to a part of the three-dimensional scene from the point cloud data frame set, comprising:
       determining, based on trajectories corresponding to the point cloud data frame set, a position of an intersection in the three-dimensional scene, comprising:
           performing dilation on a trajectory image comprising the trajectories to determine a line representing a road by dilating trajectories corresponding to the road; determining, based on the line, at least one corner point at the intersection; and determining the position of the intersection based on the at least one corner point at the intersection;
       forming, based on the position of the intersection, a connection diagram connecting the intersection; and
       determining, based on the connection diagram, a closed path as the part of the three-dimensional scene;
   updating the subset by removing data points associated with a dynamic object from point cloud data frames in the subset;
   adjusting a pose parameter of a point cloud data frame in the updated subset to obtain an adjusted subset, the adjusted subset including at least two point cloud data frames having matching overlapping parts; and
   updating the point cloud data frame set using the adjusted subset.

2. The method according to claim 1, wherein the removing data points comprises:
   removing data points representing a ground from the point cloud data frames;
   recognizing the dynamic object in the point cloud data frames;
   removing data points representing the dynamic object from the point cloud data frames; and
   adding the data points representing the ground into the point cloud data frames.

3. The method according to claim 2, wherein the recognizing the dynamic object comprises:
   clustering point cloud data in the point cloud data frames to determine a plurality of clusters in the point cloud data frames; and
   determining a cluster matching an attribute of the dynamic object from the plurality of clusters.

4. The method according to claim 1, wherein the adjusting a pose parameter comprises:
   extracting data points representing a static object from point cloud data frames in the subset, to update the subset; and
   adjusting a pose parameter of a point cloud data frame in the updated subset.

5. The method according to claim 1, wherein the at least two point cloud data frames include a first point cloud data frame and a second point cloud data frame, and the adjusting a pose parameter comprises:
   determining a characteristic distance between corresponding objects in the first point cloud data frame and the second point cloud data frame; and
   adjusting the pose parameter based on the characteristic distance.

6. The method according to claim 1, wherein the updating the point cloud data frame set comprises:
   determining another part of the three-dimensional scene, the another part overlapping the part of the three-dimensional scene;
   determining another subset corresponding to the another part of the three-dimensional scene from the point cloud data frame set; and
   adjusting a pose parameter of a point cloud data frame in the subset and a pose parameter of a point cloud data frame in the another subset, to cause a third point cloud data frame in the subset to overlap a fourth point cloud data frame in the another subset.

7. The method according to claim 1, where the updating the point cloud data frame set comprises:
- determining a pose parameter of a fifth point cloud data frame in the part through a global navigation satellite system; and
- updating the point cloud data frame set based on the pose parameter of the fifth point cloud data frame.

8. An apparatus for reconstructing a three-dimensional scene, comprising:
- at least one processor; and
- a memory storing instructions, the instructions when executed by the at least one processor, cause the at least one processor to perform operations, the operations comprising:
- acquiring a point cloud data frame set for the three-dimensional scene, point cloud data frames in the point cloud data frame set respectively having a pose parameter;
- determining a subset corresponding to a part of the three-dimensional scene from the point cloud data frame set, comprising:
  - determining, based on trajectories corresponding to the point cloud data frame set, a position of an intersection in the three-dimensional scene, comprising: performing dilation on a trajectory image comprising the trajectories to determine a line representing a road by dilating trajectories corresponding to the road; determining, based on the line, at least one corner point at the intersection; and determining the position of the intersection based on the at least one corner point at the intersection;
  - forming, based on the position of the intersection, a connection diagram connecting the intersection; and
  - determining, based on the connection diagram, a closed path as the part of the three-dimensional scene;
- updating the subset by removing data points associated with a dynamic object from point cloud data frames in the subset;
- adjusting a pose parameter of a point cloud data frame in the updated subset to obtain an adjusted subset, the adjusted subset including at least two point cloud data frames having matching overlapping parts; and
- updating the point cloud data frame set using the adjusted subset.

9. The apparatus according to claim 8, wherein the removing data points comprises:
- removing data points representing a ground from the point cloud data frames;
- recognizing the dynamic object in the point cloud data frames;
- removing data points representing the dynamic object from the point cloud data frames; and
- adding the data points representing the ground into the point cloud data frames,
- wherein the recognizing the dynamic object comprises:
- clustering point cloud data in the point cloud data frames to determine a plurality of clusters in the point cloud data frames; and
- determining a cluster matching an attribute of the dynamic object from the plurality of clusters.

10. The apparatus according to claim 8, wherein the adjusting a pose parameter comprises:
- extracting data points representing a static object from point cloud data frames in the subset, to update the subset; and
- adjusting a pose parameter of a point cloud data frame in the updated subset.

11. The apparatus according to claim 8, wherein the at least two point cloud data frames include a first point cloud data frame and a second point cloud data frame, and the pose adjusting a pose parameter comprises:
- determining a characteristic distance between corresponding objects in the first point cloud data frame and the second point cloud data frame; and
- adjusting the pose parameter based on the characteristic distance.

12. The apparatus according to claim 8, wherein the updating the point cloud data frame set comprises:
- determining another part of the three-dimensional scene, the another part overlapping the part of the three-dimensional scene;
- determining another subset corresponding to the another part of the three-dimensional scene from the point cloud data frame set; and
- adjusting a pose parameter of a point cloud data frame in the subset and a pose parameter of a point cloud data frame in the another subset, to cause a third point cloud data frame in the subset to overlap a fourth point cloud data frame in the another subset.

13. The apparatus according to claim 8, where the updating the point cloud data frame set comprises:
- determining a pose parameter of a fifth point cloud data frame in the part through a global navigation satellite system; and
- updating the point cloud data frame set based on the pose parameter of the fifth point cloud data frame.

14. A non-transitory computer readable storage medium, storing a computer program, wherein the program, when executed by a processor, causes the processor to perform operations, the operations comprising:
- acquiring a point cloud data frame set for the three-dimensional scene, point cloud data frames in the point cloud data frame set respectively having a pose parameter;
- determining a subset corresponding to a part of the three-dimensional scene from the point cloud data frame set, comprising:
  - determining, based on trajectories corresponding to the point cloud data frame set, a position of an intersection in the three-dimensional scene, comprising: performing dilation on a trajectory image comprising the trajectories to determine a line representing a road by dilating trajectories corresponding to the road; determining, based on the line, at least one corner point at the intersection; and determining the position of the intersection based on the at least one corner point at the intersection;
  - forming, based on the position of the intersection, a connection diagram connecting the intersection; and
  - determining, based on the connection diagram, a closed path as the part of the three-dimensional scene;
- updating the subset by removing data points associated with a dynamic object from point cloud data frames in the subset;
- adjusting a pose parameter of a point cloud data frame in the updated subset to obtain an adjusted subset, the adjusted subset including at least two point cloud data frames having matching overlapping parts; and
- updating the point cloud data frame set using the adjusted subset.

* * * * *